United States Patent [19]

Duke

[11] 4,384,977
[45] May 24, 1983

[54] POLYALKYLOXYAMINES AS DEMULSIFYING AGENTS

[75] Inventor: Roy B. Duke, Littleton, Colo.

[73] Assignee: Marathon Oil Company, Findlay, Ohio

[21] Appl. No.: 272,454

[22] Filed: Jun. 11, 1981

[51] Int. Cl.³ .............................................. B01D 17/04
[52] U.S. Cl. ...................................................... 252/344
[58] Field of Search ............................................ 252/344

[56] References Cited

U.S. PATENT DOCUMENTS

| | | | |
|---|---|---|---|
| 3,579,466 | 5/1971 | Quinlan | 252/331 |
| 3,591,520 | 7/1971 | McDonald | 252/329 |
| 3,594,393 | 7/1971 | Buriks et al. | 252/327 |
| 3,617,571 | 11/1971 | Mange et al. | 210/54 |
| 3,640,894 | 2/1972 | Sampson | 252/344 |
| 3,647,711 | 3/1972 | Annand et al. | 252/344 |
| 3,699,051 | 10/1972 | Sampson | 252/344 |
| 3,819,589 | 6/1974 | Fauke et al. | 260/78.5 T |
| 3,929,632 | 12/1975 | Buriks et al. | 210/43 |
| 4,089,803 | 5/1978 | Bessler | 252/344 |
| 4,226,702 | 10/1980 | Vinatieri | 208/188 |

Primary Examiner—Maurice J. Welsh
Attorney, Agent, or Firm—Jack L. Hummel

[57] ABSTRACT

A process for the demulsification of an emulsion comprising contacting the emulsion with a compound of the formula:

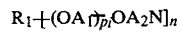

$$R_1 + (OA_1)_{pi}OA_2N]_n$$

wherein:

$R_1$ is selected from the group consisting of hydrogen, an alkyl, an aryl, an alkylaryl, a heterocyclic and N,N'-diurea;

$+OA_1+$ is an alkyleneoxy substituent;

$-OA_2N$ is a nitrogen-containing alkyleneoxy group;

n is an interger having a value of at least 1 which denotes the number of $-OA_1OA_2N$ groups attached to $R_1$;

p is 0 or an interger denoting the number of $+OA_1+$ units in each of the n groups attached to $R_1$; and i is a subscript which distinguishes between the individual p group or each of the n groups.

26 Claims, 2 Drawing Figures

POLYALKYLOXYAMINES AS DEMULSIFYING AGENTS

TECHNICAL FIELD

This invention relates to the use of polyalkyloxyamines as demulsifiers for crude oil emulsions particularly those resulting from micellar or micellar-polymer floods.

BACKGROUND ART

Due to the gradually dwindling reserves and declining production of crude oil in the U.S.A., a number of enhanced oil recovery (EOR) projects have been undertaken to stimulate production from known oil fields that are beyond their economic recovery limits. One of these EOR methods injects a surfactant into the reservoir which lowers the oil-brine interfacial tension and allows more oil to be produced. Such processes are commonly known as micellar or micellar-polymer floods.

Although surfactant systems have proved successful in mobilizing and recovering additional oil, they have also introduced problems which have heretofore not been encountered. Foremost among these is the need to demulsify the produced oil. The emulsion is caused primarily by the surfactants, cosurfactants and polymer used in the process. The demulsifying process of the present invention is particularly applicable for separating emulsions of this type.

PRIOR ART STATEMENT

Organic compounds used for demulsifying crude oil and other hydrocarbon streams include quaternary ammonium adducts of polyepihalohydrins of U.S. Pat. No. 3,591,520; polyurethanes of U.S. Pat. No. 3,594,393; high molecular weight polyoxiranes of U.S. Pat. No. 3,617,571; cyclic amidine polymers of U.S. Pat. No. 3,647,711; polymeric quaternary ammonium betaines; e.g., quaternary alkanolamine esters of U.S. Pat. No. 3,819,589; betaines of U.S. Pat. No. 3,929,632; adjunct demulsifiers of polyalkylenepolyamines as disclosed in U.S. Pat. No. 4,089,803; and polyoxyalkylated alkylphenolformaldehyde polycondensates of U.S. Pat. Nos. 3,640,894 and 3,699,051. In addition, U.S. Pat. No. 3,579,466 discloses the use of polyglycidyl polymers and polyglycidyl amine polymers, e.g., polyoxyalkylene polymers with oxygen- or nitrogen-containing functional groups.

The composition of demulsifiers varies, depending upon the particular application. For sulfonate-containing emulsions, U.S. Pat. No. 4,089,803, assigned to the Petrolite Corporation, discloses a demulsifier consisting of a mixture of an oxyalkylated phenol-aldehyde resin, a polyethylene amine, and an alkanol amine. The oxyalkylated phenol-aldehyde resin may be a phenolformaldehyde polymer which has been subsequently reacted with ethylene oxide to achieve the desired degree of ethoxylation. The polyethylene amine may be pentamethylene hexamine, and the alkanol amine may be triethanol amine. Demulsifiers of this type have been marketed under the trade names Tretolite RP-453 and Tretolite RP-578.

U.S. Pat. No. 4,226,702 teaches the use of inorganic compounds to demulsify micellar or micellar-polymer emulsions, by adding an electrolyte, such as sodium chloride, and supplemental water.

The demulsifiers of the prior art consist largely of mixtures of ionic and nonionic surfactants which, when added to an emulsion, alter its hydrophilic-lipophilic balance (HLB); proper adjustment of this parameter usually causes demulsification. In addition, some demulsifiers include compounds for complexing with metallic ions to render them more water soluble; others contain acids, bases, or buffered solutions for controlling the pH.

DISCLOSURE OF THE INVENTION

The demulsifiers of the present invention are polyalkyloxyamines and are defined by formula I.

$$R_1\text{—}[(OA_1)_{\overline{m}}OA_2N]_n \qquad (I)$$

where $R_1$ is hydrogen, or an alkyl, aryl, or alkylaryl group, or a heterocyclic group. The alkeneoxy group, $-OA_1-$, is derived from an alkylene oxide such as ethylene oxide, propylene oxide, butylene oxide, 2-butylene oxide, isobutylene oxide and the like, such as:

and $-OA_2N$ is a nitrogen-containing alkyloxy group such as 2-(N—imidazolyl)-propyloxy 2-(ureido)-propyloxy 2-(hydroxyethylamino)-propyloxy aminoethyloxy 2-amino-1-butyloxy 2-[bis-(hydroxyethyl)]-aminopropyloxy;

$A_1$ and $A_2$ may be the same or different alkyls;

n is an integer having a value of at least one which denotes the number of $-(-OA_1-)_{p_i}OA_2N$ groups attached to $R_1$;

p is zero or an integer denoting the number of $-(-OA_1-)-$ units in each of the n groups attached to $R_1$; and i is a subscript for distinguishing between the individual p's in each of the n groups attached to $R_1$.

The total number of alkyleneoxy groups, $-(-OA_1-)-$, per molecule is given by equation 1:

$$\Sigma -(-OA_1-)- = \sum_{i=i}^{i=n} p_i = p_i + p_j + p_k + \ldots \quad (1)$$

The average number of alkyleneoxy groups, $-(-OA_1-)-$, in each of the n groups attached to $R_1$ is given by equation 2:

$$\bar{p} = \frac{\sum_{i=i}^{i=n} p_i}{n} \quad (2)$$

To demonstrate the use of formula I and the calculation of $\bar{p}$, consider the molecule:

wherein $R_1$ is a 1,1,1-trimethylenepropane radical, $$CH_3-CH_2-\underset{\underset{CH_2-}{|}}{\overset{\overset{CH_2-}{|}}{C}}-CH_2-$$

$-(-OA_1-)-$ is a propyleneoxy group, $$-(-O-CH_2-\underset{\underset{CH_3}{|}}{CH})-$$

$-OA_2N$ is a 2-aminopropyloxy group, $$-O-CH_2-\underset{\underset{CH_3}{|}}{CH}-NH_2.$$

Therefore, p is, $$\bar{p} = \frac{\sum_{i=i}^{i=k} p_i}{n} = \frac{3+7+4}{3} = 4.67$$

Some commercially available compounds that belong to formula I are shown in Table I along with their corresponding tradenames. These are produced by the Jefferson Chemical Co., a subsidiary of Texaco, Inc. The number contained within the name of the Jeffamine is indicative of that particular compound's average molecular weight.

TABLE 1

| Tradename | $R_1$ | $-(-OA_1-)-$ | $-OA_2N$ | n | $\bar{p}$ |
|---|---|---|---|---|---|
| Jeffamine T-403 | 1,1,1-trimethylenepropane | propyleneoxy | 2-aminopropyloxy | 3 | 0.75 |
| Jeffamine TA-345 | 1,2-propenyl | propyleneoxy | 3-aminopropyl-2-aminopropyloxy | 2 | 0.8 |
| Jeffamine D-230 | 1,2-propenyl | propyleneoxy | 2-aminopropyloxy | 2 | 0.8 |
| Jeffamine D-400 | 1,2-propenyl | propyleneoxy | 2-aminopropyloxy | 2 | 2.3 |
| Jeffamine D-2000 | 1,2-propenyl | propyleneoxy | 2-aminopropyloxy | 2 | 16.1 |
| Jeffamine ED-600 | 1,2-ethenyl | ethyleneoxy | 2-aminopropyloxy | 2 | 6.3 |
| Jeffamine ED-900 | 1,2-ethenyl | ethyleneoxy | 2-aminopropyloxy | 2 | 9.7 |
| Jeffamine ED-2001 | 1,2-ethenyl | ethyleneoxy | 2-aminopropyloxy | 2 | 22 |
| Jeffamine BUD-2000 | 1,2-propenyl | propyleneoxy | 2-carbamidopropyloxy | 2 | 14.8 |
| Jeffamine DU-700 | 1,2-propenyl[a] | propyleneoxy | 2-carbamidopropyloxy | 2 | 3.6 |
| Jeffamine DU-1700 | 1,2-propenyl[a] | propyleneoxy | 2-carbamidopropyloxy | 2 | 12.2 |
| Jeffamine DU-3000 | 1,2-propenyl[a] | propyleneoxy | 2-carbamidopropyloxy | 2 | 23.5 |
| Jeffamine 5060-47-B | 1,1,1-tetramethylene methane | propyleneoxy | 2-aminopropyloxy | 4 | not known |

[a]The DU series compounds also contain internal urea linkages.

The demulsifiers of the present invention may be prepared by adding ethylene, propylene or butylene oxide to a hydroxy compound, such as a diol or triol, including phenolic compounds such as phenol, resorcinol, and catechol. Mixtures of alkylene oxides may also be used either sequentially to form block polymers or simultaneously to form random polymers. The terminal hydroxy group of the polyoxyalkyl chain is then replaced by a nitrogen-containing compound by a substitution reaction with ammonia, or an amine, such as morpholine, or a diamine such as urea, by methods known in the chemical literature and patent art. The hydroxy compounds mentioned above include glycols formed by oligomerizing ethylene, propylene, or butylene oxide. To terminate the alkyleneoxy addition compounds, another molecule may be added to the hydroxyl group which either is or can be converted to an amine, e.g., the addition of acrylonitrile followed by reduction of an amine.

The demulsifiers are not usually synthetically pure compounds, i.e., a single substance. This is because the addition of ethylene or propylene oxide to a diol, triol, etc., is random. As a result, some of the hydroxyl groups of the diol or triol may add numerous alkylene oxide units, whereas, others may add only a few or perhaps none. However, despite the fact that the demulsifiers of the present invention are not pure compounds, they can be generally described by formula I.

Since the molecular weights of $R_1$, $\text{---}(OA_1\text{---})$, $\text{---}OA_2N$, and the value of n are predetermined by the choice of starting materials, $\bar{p}$ can be calculated from equation (3), if the average molecular weight is determined.

$$\bar{p} = (a - b - nc)/nd \qquad (3)$$

where,
a is the experimentally determined, average molecular weight of the demulsifier,
b is the molecular weight of $R_1$,
c is the molecular weight of $\text{---}OA_2N$,
d is the molecular weight of $OA_1$, and
n is as previously defined.

For example, a demulsifier prepared by first adding propylene oxide to trimethylol propane followed by termination with ammonia has an experimentally determined average molecular weight of 421. Thus, a=421, b=83, c=74, d=58 and n=3, giving p a value of 0.67.

In the present invention, the term demulsification is defined as the process of separating an emulsion into a phase containing relatively pure hydrocarbon and little water and another phase or phases containing the remainder of the constituents of the emulsion, but relatively little hydrocarbon. Ideally, an aqueous phase containing the surfactant and demulsifier are separated as one phase and the hydrocarbon as the other; however, quite commonly, a phase of intermediate density between that of the hydrocarbon and aqueous phase is also present. This phase will be referred to as the middle phase emulsion or MPE.

The produced fluids from micellar or micellar-polymer floods are three-phase systems. All three phases may be observed by allowing the fluids to stand quiescently until separation is complete. The upper phase, also referred to as the hydrocarbon phase, is black in color and consists largely of reservoir crude oil. The MPE is gray or black and quite viscous. The lower phase, also referred to as the aqueous or brine phase, is yellow to amber and usually translucent. At the height of oil production, the relative amounts of the three phase might characteristically be:

| | |
|---|---|
| Upper Phase | 13 ± 5% |
| Middle Phase | 2 ± 2% |
| Lower Phase | 87 ± 7% |

The upper phase emulsion is stabilized by oil-soluble surfactants; it can at times contain as much as 10-12 percent of water and surfactant, but usually this total is less than five percent.

The MPE is a viscous macroemulsion consisting of about equal quantities of oil and brine. It is stabilized by surfactants, usually divalent ion sulfonates, and the polymers, e.g., polyacrylamides, used for mobility control. The MPE sometimes contains a higher concentration of surfactant than either the aqueous lower phase or the hydrocarbon upper phase. Because of its high viscosity, it often contains suspended solids.

The lower phase is brine. It contains salts as well as the more water-soluble surfactants of the micellar solution. With adequate retention time, this phase contains less than 0.10 percent oil.

The demulsifiers of the present invention may be used to treat crude oil derived from primary, secondary or tertiary production. The demulsifiers are particularly useful in the treatment of oil produced by secondary or tertiary production which utilizes a surfactant flood. The demulsifiers of the present invention are especially beneficial in the demulsification of crude oil produced by a surfactant flood which is a micellar dispersion.

The term micellar or micellar dispersion is intended to encompass flooding with systems of the type taught by H. J. Hill, J. Reisberg, and G. L. Stegemeier, *J. Pet. Tech.*, 186 (February, 1973), wherein relatively dilute aqueous solutions of surfactant and/or cosurfactant are injected; the process of R. L. Reid, et al., in U.S. Pat. No. 3,885,628, wherein a multiphase system is injected; and U.S. Pat. No. 3,082,822 to L. W. Holm, et al., wherein substantially small slugs of anhydrous soluble oils are alternately injected with small slugs of water or other aqueous media; U.S. Pat. No. 3,682,247 to Jones; U.S. Pat. No. 3,687,201 to Son, et al.; U.S. Pat. No. 3,740,343 to Jones, et al.; U.S. Pat. No. 3,956,372 to Coleman, et al.; U.S. Pat. No. 3,964,548 to Schroeder, et al.; U.S. Pat. No. 3,997,451 to Plummer, et al.; and U.S. Pat. No. 4,013,125 to Plummer, et al.

Oil produced from secondary or tertiary production may contain ionic surfactants, such as petroleum, crude oil, alkylaryl, or alkyl sulfonates; alkyl or aryl carboxylates; naturally occurring naphthenates or tetraalkylammonium salts; nonionic surfactants, such as polyoxyalkylated alcohols, phenols, or alkylated phenols, or alkylcarboxyamides; cosurfactants, such as alcohols, polyoxyalkylated alcohols or phenols, or alkyl sulfates; polymers, such as polyacrylamide or nonionic biopolymers; hydrocarbons such as crude oil, shale oil, coal liquification products, gas oils, or other petroleum fractions; and brine, containing inorganic cations from Groups IA and IIA and the transition metal series of the periodic table of the elements, and anions, such as a halide, sulfate, sulfite, carbonate, bicarbonate, nitrate, etc. The emulsions may also contain other compounds commonly used, such as biocides and anticorrosives.

Treatment of the produced fluids with the demulsifiers of this invention accelerates the rate of separation and usually lowers the water content of the oil phase; however, a three-phase system consisting of oil, MPE, and brine phases still results. The addition of large quantities of some demulsifiers can cause the MPE to dissolve in the oil, thereby yielding a two-phase system.

This is of no benefit to subsequent processing of the oil, however, since the MPE and oil must eventually be separated.

PREFERRED MODES FOR CARRYING OUT THE INVENTION

The demulsifiers of the present invention are used in concentrations of at least 1.0 part per million (ppm) and preferably between 5 and 5000 ppm, based on emulsion. Although amounts in excess of 5,000 ppm can be utilized, no advantage is gained when measured against the economics of the demulsification process. The amount depends largely upon the characteristics of the emulsion, e.g., the concentration and type of suspended solids, the amount and type polymers, if any, the viscosity of the oil, the temperature at which the demulsification is conducted, the residence time of the fluid in the processing system, the chemical composition of the brine, the oil cut of the produced fluids, the number of additional fresh water washes, etc. In general, the more surfactant and cosurfactant in the emulsion, the more demulsifier will be required.

The temperature at which demulsification occurs most readily with the demulsifiers of the present invention depends upon the viscosity of the oil, the type and concentration of the surfactant and cosurfactant, the composition of the brine, etc. In general, the higher the temperature, the more rapid is the separation; however, the residual water concentration of the oil increases with increasing temperature. As a result, the optimum temperature giving the fastest separation rate coupled with the lowest water-in-oil content cannot be specified; each system must be optimized separately. There are, however, certain limits imposed by the physical properties of the hydrocarbon and aqueous phases, e.g., separations cannot be made below the freezing point or above the boiling point of the brine. Likewise, the volatility of the hydrocarbon is important. The volatility of the demulsifier is seldom a factor. For practical purposes, where demulsification is carried out at atmospheric pressure, temperatures between 10° and 90° C. are adequate.

Electrostatic fields are often used to cause water droplet to grow in size more rapidly thereby facilitating their separation. The demulsifying agents of the present invention are nonionic and behave well in such systems.

The selection of a demulsifier for a particular application depends largely upon two interrelated factors, namely, its technical performance and its cost effectiveness. Cost effectiveness is governed by the unit cost of the demulsifier and the amount required to achieve the desired level of technical performance. Technical performance is a combination of at least two kinetic factors, namely, the rate of deoiling of the brine and the rate of dewatering of the oil. Related to the latter is a final or equilibrium water concentration of the oil. The two kinetic factors have much in common and, in general, a demulsifier that readily dewaters the oil phase will also effectively deoil the brine phase.

EXAMPLES

To demonstate the improved performance of the demulsifiers of the present invention, they have been compared to the best state-of-the-art demulsifier available, namely, Tretolite RP-578. Other companies, such as Nalco, offer demulsifiers similar to RP-578.

A centrifuge test and a simulated desalter test were utilized in the Examples to determine the performance of the demulsifier. The centrifuge test is conducted by mixing 100 milliliters (ml) of oil and 50 ml of water in a blender for 30 seconds at 70°–80° F. and then centrifuging for 15 minutes. The amount of water separated is then recorded as well as comments about its color and clarity. The oil-water interface is also examined for the presence of a middle phase referred to as PAD. The water content of the oil phase is determined by the Karl Fischer method. Values below about 0.50 percent indicate that the oil is pipeline quality.

The simulated desalter test, SDT, consists of mixing in a blender for 30 seconds 100 ml of oil with 5.0 ml of water and an amount of demulsifier which is used in a refinery desalter. The mixture is then transferred to a calibrated tube and heated to the desalter temperature. After 15 minutes, the amount of water that has separated is read and recorded as "before coalescense" (reported in the examples as "BC").

The sample is then remixed, heated again to the desalter temperature, and subjected to electrostatic coalescense for a period of fifteen minutes applying a voltage gradient similar to that of the refinery desalter. The rate at which the oil dehydrates is determined by visually reading every five minutes the water that has separated. These values are recorded using plus and minus signs to indicate an amount which is slightly more or less than the graduation on the tube.

After the electrostatic coalescense period, qualitative comments are recorded as to the clarity and color of the water phase and whether a third phase exists at the oil-water interface. The water content of the oil phase is then determined by the Karl Fischer method. Values below about 0.50 percent indicate that it will present no problems in the refinery.

The emulsions used to establish the effectiveness of the demulsifying agents were obtained from a micellar-polymer flooding of a sandstone oil reservoir located in Crawford County, Ill. Crude oil sulfonates produced by sulfonating Illinois crude followed by neutralizing with ammonia were used as the surfactant in the flood. The cosurfactant was an alcohol or ethoxylated alcohol. The reservoir had been previously waterflooded.

The flood was conducted by introducing 10 percent of a pore volume of a micellar-dispersion slug containing about 2.5 weight percent of active sulfonate groups (ASG=—$SO_3H_4$), about 0.5–1.5 weight percent cosurfactant, about 5–15 weight percent crude oil and other hydrocarbons, about 2.0–4.0 weight percent of a mixture of inorganic salts predominately ammonium sulfate and ammonium sulfite, and the remainder water. The slug was followed by 10 percent of a pore volume of about 1200 ppm polyacrylamide in water, then by less concentrated solutions of the acrylamide polymer, and finally water.

Figure 2:
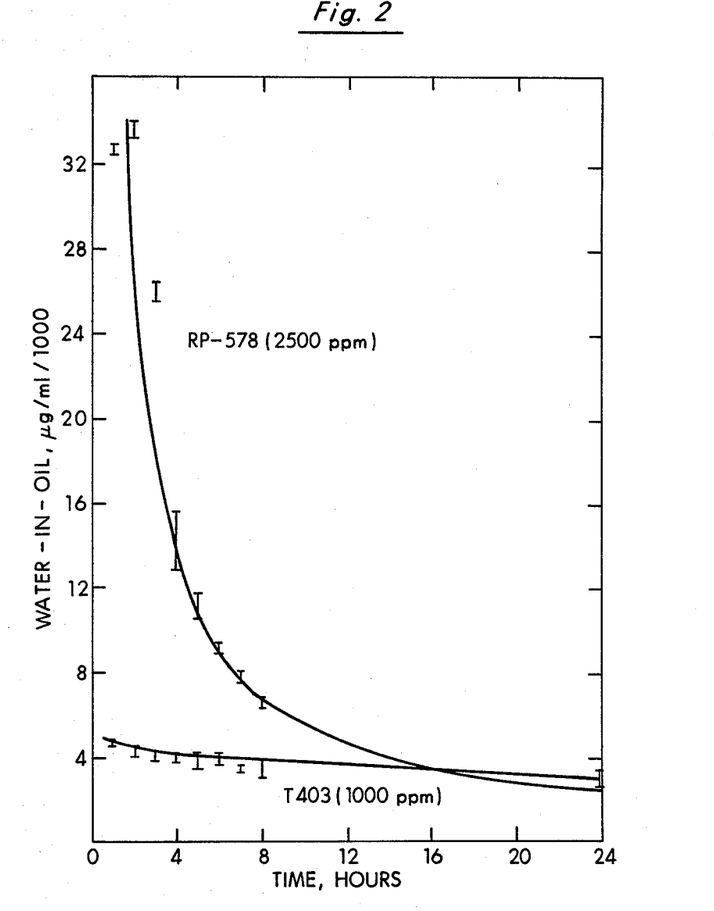
FIG. 2 is a graph of comparative rates of dewatering an emulsion with two different demulsifiers.

The relative rates of dewatering the oil following the water washing of oil (described in Example 1) with the two demulsifiers are compared in Example 3, FIG. 2. As the results show, it takes the RP-578 about 16 hours to reach a water-in-oil concentration of less than 0.50 percent, whereas, T-403 achieves this level of dehydration in less than an hour. The rate of dewatering the oil is a poignant factor in the design of a processing facility for treating surfactant, e.g., micellar, produced fluids because, if chemicals that induce slow rates are used, significantly more tankage is required. This, in turn, increases the capital investment and lowers profitability. Needless to say, the 16-fold increase in the dehydration rate expected by T-403, as compared to RP-578, is significant.

Figure 1:
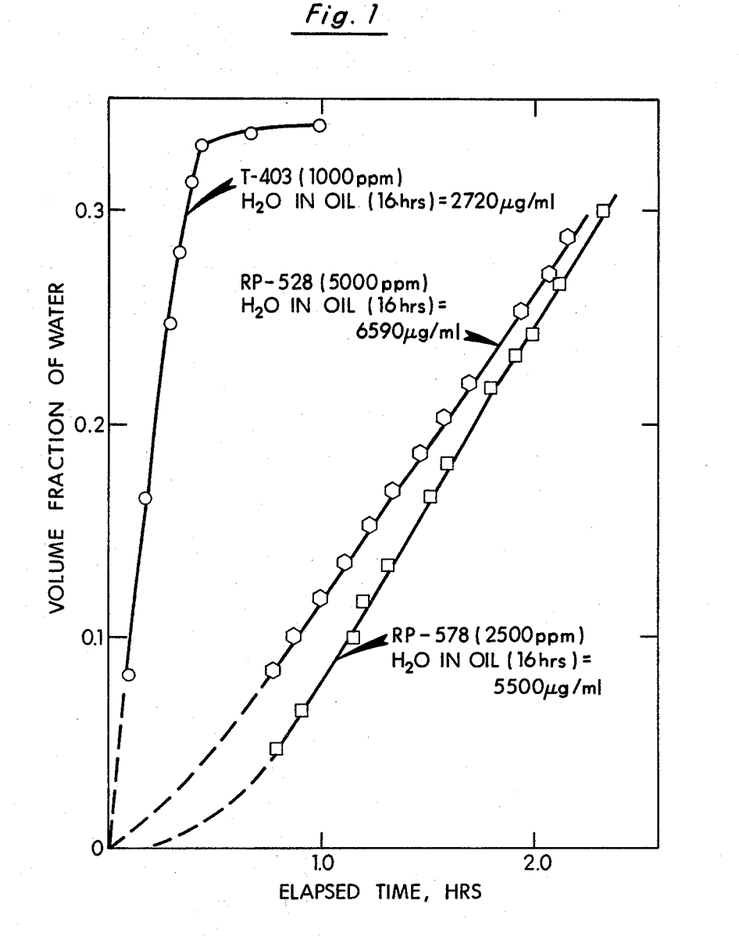
FIG. 1 is a graph of comparative rates of demulsification of two demulsifiers.

The relative rates of demulsification following the washing of oil with a demulsifier of the present invention, Jeffamine T-403, and that of Tretolite RP-578, are compared in Example 2, FIG. 1. Neglecting the induction time required for the Tretolite demulsifier to begin its task, the relative rates of deoiling can be obtained by comparing the slopes of the relatively linear portions of the separation curves. Proceeding in this manner, shows that T-403 is 3-4 times faster than RP-578. If the induction period required for the Tretolite demulsifier is taken into consideration, the relative rate of the Jeffamine is even higher.

The final water contents (16 hours) of the water-washed oil demulsified with T-403 and RP-578 were 2700 and 5500 micrograms ($\mu$g) per ml, respectively. These values are near the equilibrium concentrations and demonstrate that, in addition to giving markedly improved dehydration rates, the demulsifiers of this invention ultimately produce drier oil.

The remaining Examples, 4-10, further demonstrate the demulsification properties of polyalkyloxyamines as compared to prior art demulsifiers.

EXAMPLE 1

Samples of produced fluids from one of the sandstone reservoirs, previously mentioned, were taken at a time when they had an oil cut of about 20 percent. The fluids, prior to addition of demulsifying chemicals, were allowed to stand quiescently for 24 hours; the lower brine phase and the middle phase were then separated. The upper phase, referred to as the oil phase, was used in Examples 2 through 10.

EXAMPLE 2

Two parts of the oil phase (Example 1), one part of water and 1000 ppm of Jeffamine T-403 were mixed in a blender for one minute and then transferred to a graduated cylinder. The rate at which the mixture separated was determined by recording the volume of brine as a function of time. The volume fractions of brine were then calculated and plotted against time as shown in FIG. 1. Assuming complete demulsification, the final volume fraction of water should be 0.33.

After 16 hours of quiescent standing, the water content of the oil phase was determined by the Karl Fischer method. This is also recorded in FIG. 1.

In like manner, two identical experiments were conducted using the same reactants and procedure except that 2500 and 5000 ppm of Tretolite's RP-578 was used as the demulsifier instead of Jeffamine T-403. After calculation of the volume fractions, these data were also plotted on FIG. 1. The water contents of the demulsified oil phases were determined by the Karl Fischer method and are indicated in FIG. 1.

EXAMPLE 3

Two parts of oil phase (Example 1), one part of water, and 1000 ppm of Jeffamine T-403 were mixed in a blender for one minute and then transferred to a graduated cylinder. Samples of the oil phase were taken periodically and the water content determined by the Karl Fischer method. These values, plotted against time, are shown in FIG. 2.

In like manner, another experiment was conducted using the same reactants and procedure except that 2500 ppm of Tretolite RP-578 was used as the demulsifier instead of Jeffamine T-403. The results from this experiment are also plotted in FIG. 2.

EXAMPLE 4

Four samples of the oil phase (Example 1) were mixed in a blender for one minute with 50 percent water, and the amounts of Jeffamine T-403 and Tretolite RP-578 shown in Table 2. The mixtures were then transferred to a separatory funnel and heated to 100° F. After 16 hours, the brine was separated and the demulsified oil subjected to the simulated desalter test. The results are shown in Table 2.

TABLE 2

Simulated Desalter Test of Oil Demulsified with Jeffamine T-403 and Tretolite RP-578

| Demulsifier (ppm) | BC | Time, min. 5 | 10 | 15 | Water Quality | Interface Quality | $H_2O$ % Before | After |
|---|---|---|---|---|---|---|---|---|
| T-403 (1000) | 3 | 5 | 5 | 5 | clear yellow | No PAD | 0.05 | 0.21 |
| T-403 (500) | 1 | 4+ | 5+ | 5+ | clear | No PAD | 0.03 | 0.34 |
| RP-578 (2500) | 1+ | 5 | 5+ | 5+ | light brown | Slight PAD | 0.08 | 0.29 |
| RP-578 (5000) | 2+ | 5+ | 5+ | 5+ | light brown | No PAD | 0.08 | 0.22 |

EXAMPLE 5

Three samples of the oil phase (Example 1) were mixed in a blender for one minute with 50 percent water, and the amount of Jeffamine TA-345 shown in Table 3. The mixtures were then transferred to a separatory funnel and heated to 100° F. After the 16 hours, the brine was separated and the demulsified oil subjected to the simulated desalter test. The results are shown in Table 3.

TABLE 3

Simulated Desalter Test of Oil Demulsified with Jeffamine TA-345

| Demulsifier | | Time, min. | | | Water | Interface | H₂O % | |
|---|---|---|---|---|---|---|---|---|
| (ppm) | BC | 5 | 10 | 15 | Quality | Quality | Before | After |
| TA-345 (1000) | 1 | 4+ | 5+ | 5+ | clear | No PAD | 0.03 | 0.36 |
| TA-345 (500) | 1− | 4+ | 5 | 5+ | clear | No PAD | 0.03 | 0.29 |
| TA-345 (250) | 1− | 2+ | 4 | 4+ | tan | No PAD | 0.03 | 1.10 |

EXAMPLE 6

Two samples of the oil phase (Example 1) were mixed in a blender for one minute with 50 percent water, and the amount of Jeffamines DU-700 and DU-3000 shown in Table 4. The mixtures were then transferred to a separatory funnel and heated to 100° F. After 16 hours, the brine was separated and the demulsified oil subjected to the centrifuge test. The results are shown in Table 4.

TABLE 4

Centrifuge Test of Oil Demulsified with the Jeffamine DU Series Compounds

| Demulsifier (ppm) | Water Quality | Interface Quality | H₂O % Before | H₂O % After |
|---|---|---|---|---|
| Jeffamine DU-700 (1500) | Clear | 0.4 ml PAD | 0.05 | 0.07 |
| Jeffamine DU-3000 (1500) | Clear | 1.5 ml PAD | 0.05 | 0.07 |

EXAMPLE 7

Three samples of the oil phase (Example 1) were mixed in a blender for one minute with 50 percent water, and the amount of Jeffamine D-Series shown in Table 5. The mixtures were then transferred to a separatory funnel and heated to 100° F. After 16 hours, the brine was separated and the demulsified oil subjected to the simulated desalter test. The results are shown in Table 6.

TABLE 5

Simulated Desalter Test of Oil Demulsified with the Jeffamine D-Series of Compounds

| Demulsifier | | Time, min. | | | Water | Interface | H₂O % | |
|---|---|---|---|---|---|---|---|---|
| (ppm) | BC | 5 | 10 | 15 | Quality | Quality | Before | After |
| D-230 (1250) | 4+ | 5+ | 5+ | 6− | clear | No PAD | 0.05 | 0.25 |
| D-400 (1250) | 4+· | 5 | 5+ | 6− | clear | No PAD | 0.08 | 0.29 |
| D-2000 (1200) | 1 | 5+ | 6− | 6− | clear | No PAD | 0.05 | 0.22 |

EXAMPLE 8

A sample of the oil phase (Example 1) was mixed in a blender for one minute with 50 percent water, and the amount of Experimental Jeffamine 5060-47-B shown in Table 6. The mixture was then transferred to a separatory funnel and heated to 100° F. After 16 hours, the brine was separated and the demulsified oil subjected to the centrifuge test. The results are shown in Table 6.

TABLE 6

Simulated Desalter Test of Oil Demulsified with Experimental Jeffamine 5060-47-B

| Demulsifier (ppm) | Water Quality | Interface Quality | H₂O % Before | H₂O % After |
|---|---|---|---|---|
| 5060-47-B (1500) | Clear | No PAD | 0.09 | 0.13 |

EXAMPLE 9

A sample of the oil phase was mixed in a blender for one minute with 50 percent water, and the amount of Jeffamine ED-600 shown in Table 7. The mixture was then transferred to a separatory funnel and heated to 100° F. After 16 hours, the brine was separated and the demulsified oil subjected to the simulated desalter test. The results are shown in Table 7.

TABLE 7

Simulated Desalter Test of Oil Demulsified with Jeffamine ED-Series Compounds

| Demulsifier | | Time, min. | | | Water | Interface | H₂O % | |
|---|---|---|---|---|---|---|---|---|
| (ppm) | BC | 5 | 10 | 15 | Quality | Quality | Before | After |
| ED-600, (1250) | 0+ | 4+ | 5 | 6− | Clear | No PAD | 0.16 | 0.28 |

EXAMPLE 10

A sample of the oil phase (Example 1) was mixed in a blender for one minute with 50 percent water, and the amounts of Jeffamine BUD-2000 shown in Table 8. The mixture was then transferred to a separatory funnel and heated to 100° F. After 16 hours, the brine was separated and the demulsified oil subjected to the centrifuge test. The results are shown in Table 8.

TABLE 8

Centrifuge Test of Oil Demulsified with Jeffamine BUD-2000

| Demulsifier (ppm) | Water Quality | Interface Quality | H₂O % Before | H₂O % After |
|---|---|---|---|---|
| BUD-2000 (2000) | Clear | 0.3 ml PAD | 0.06 | 0.08 |

What is claimed is:

1. A process for the demulsification of a crude oil emulsion comprising contacting the emulsion with a compound having a formula:

$$R_1 - [(OA_1)_{\overline{p}} OA_2 N]_n$$

wherein:
R₁ is selected from the group consisting of an alkyl, an aryl, an alkylaryl, a heterocyclic and N,N'-diurea;
−(OA₁)− is an alkyleneoxy substituent;
—OA₂N is a nitrogen-containing alkyloxy group;

n is an integer having a value of at least 1 which denotes the number of $-(OA_1)_{P_i}OA_2N$ groups attached to $R_1$;

p is an integer denoting the number of $(OA_1)$ units in each of the n groups attached to $R_1$; and i is a subscript which distinguishes between the individual p groups.

2. The process of claim 1 wherein $R_1$ is selected from the group consisting of an alkyl, and N,N'-diurea, $-(OA_1)-$ and $-(OA_2)-$ are each a substituent selected from the group consisting of ethyleneoxy, propyleneoxys and butyleneoxys and N is a nitrogen-containing substituent selected from the group consisting of amino, methylamino, dimethylamino, cyanoethylamino, morpholinyl, imidazolyl, carbamido and hydroxyethylamino.

3. The process of claim 1 or claim 2 wherein n is a value of from 1 to 4, the average number of $-(OA_1)-$ groups per demulsification compound is from 1 to about 35.

4. The process of claim 3 wherein the demulsification compound has an average molecular weight of from about 200 to about 3500.

5. The process of claim 1 or claim 2 wherein the emulsion comprises a surfactant produced crude oil.

6. The process of claim 5 wherein the emulsion is contacted with at least 10 parts per million of the demulsification compound based upon the amount of emulsion.

7. The process of claim 5 wherein the crude oil is produced by a surfactant flood containing at least one ionic surfactant.

8. The process of claim 7 wherein the ionic surfactant is a petroleum sulfonate.

9. The process of claim 7 wherein the emulsion is contacted with from about 50 to about 5000 parts per million of the demulsification compound based upon the amount of the emulsion.

10. The process of claim 8 wherein the emulsion contains divalent salts of the surfactant and the emulsion is additionally treated in a manner to effect a change in the salts of the surfactant to monovalent salts.

11. A process for the demulsification of a surfactant produced crude oil emulsion comprising contacting the emulsion with a compound of the formula:

wherein:
$R_1$ is selected from the group consisting of 1,1,1-trimethylene methane, 1,1,1,1-tetramethylene methane, 1,2-propenyl, 1,2-ethenyl and N,N'-diurea;

$-(OA_1)-$ and $-(OA_2)-$ are selected from the group consisting of ethyleneoxy, propyleneoxy and 2-propyleneoxy;

N is a nitrogen-containing substituent selected from the group consisting of amino, dimethyl-amino, methylamino, hydroxyethylamino, cyanoethyl amino, morpholinyl, imidazolyl and carbamido;

n is an integer having a value of from 1 to 4;

p is an integer denoting the number of $-(OA_1)-$ units in each of the n groups, which has an average number per demulsification compound of from 0 to about 25; and i is a subscript distinguishing between the individual p groups of each of the n groups.

12. The process of claim 11 wherein fresh water is added to the mixture of the emulsion and demulsifier.

13. The process of claim 11 wherein $R_1$ is 1,1,1-trimethylene methane, $-(OA_1)-$ and $-(OA_2)-$ are each 2-propyleneoxy, N is a nitrogen-containing substituent which is an amino group, n is 3, the average number of $-(OA_1)-$ groups in the demulsification compound is from about 0.75 to about 2.5 and the average molecular weight of the demulsification compound is from about 200 to about 400.

14. The process of claim 11 wherein $R_1$ is 1,2-propenyl, $-(OA_1)-$ and $-(OA_2)-$ are each 2-propyleneoxy, N is an amino group, n is 2, the average number of $-(OA_1)-$ groups in the demulsification compound is from about 0.8 to about 16 and the average molecular weight of the demulsification compound is from about 230 to about 2000.

15. The process of claim 13 or 14 wherein the demulsification compound utilized in an amount of from about 10 to about 5000 parts per million of the demulsification compound based on the amounts of emulsion.

16. The process of claim 11 wherein an electrostatic field is applied to the mixture of the emulsion and demulsifier.

17. The process of claim 11 or claim 16 wherein heat is applied to the mixture of the emulsion and demulsifier.

18. A process for the demulsification of a crude oil emulsion comprising contacting the emulsion with a compound having a formula:

wherein:
n is an integer having a value of at least 1 which denotes the number of $-(OA_1)_{P_i}OA_2N$ groups attached to $R_1$;

p is 0 or an integer denoting the number of $(OA_1)$ units in each of the n groups attached to $R_1$;

i is a subscript which distinguishes between the individual p groups of each of the n groups;

$R_1$ is selected from the group consisting of an alkyl and N,N'-diurea;

$(OA_1)$ and $(OA_2)$ are each a substituent selected from the group consisting of ethyleneoxy, propyleneoxys and butyleneoxys; and N is a nitrogen-containing substituent selected from the group consisting of amino, methylamino, dimethylamino, cyanoethylamino, morpholinyl, imidazolyl, carbamido and hydroxyethylamino.

19. The process of claim 18 wherein n is a value of from 1 to 4, the average number of $-(OA_1)-$ groups per demulsification compound is from 0 to about 35.

20. The process of claim 19 wherein the demulsification compound has an average molecular weight of from about 200 to about 3500.

21. The process of claim 18 wherein the emulsion comprises a surfactant produced crude oil.

22. The process of claim 21 wherein the emulsion is contacted with at least 10 parts per million of the demulsification compound based upon the amount of emulsion.

23. The process of claim 21 wherein the crude oil is produced by a surfactant flood containing at least one ionic surfactant.

24. The process of claim 23 wherein the ionic surfactant is a petroleum sulfonate.

25. The process of claim 23 wherein the emulsion is contacted with from about 50 to about 5000 parts per million of the demulsification compound based upon the amount of the emulsion.

26. The process of claim 24 wherein the emulsion contains divalent salts of the surfactant and the emulsion is additionally treated in a manner to effect a change in the salts of the surfactant to monovalent salts.

* * * * *

UNITED STATES PATENT AND TRADEMARK OFFICE
CERTIFICATE OF CORRECTION

PATENT NO. : 4,384,977
DATED : May 24, 1983
INVENTOR(S) : Roy B. Duke

It is certified that error appears in the above-identified patent and that said Letters Patent are hereby corrected as shown below:

| | |
|---|---|
| Abstract, line 11: | Delete "interger" and insert --integer--. |
| Abstract, line 14: | Delete "interger" and insert --integer--. |
| Col. 2, line 19: | Delete "-OA$_1$-" and insert --$\{OA_1\}$--. |
| Col. 2, line 31: | Delete "=" at both occurrences and insert -- - -- at both occurrences. |
| Col. 2, line 35: | Delete "=" and insert -- - --. |
| Col. 2, line 65: | Delete "pholinyl)" and insert --phyolyl)--. |
| Col. 2, line 66: | Delete "propyloxy" and insert --propyleneoxy--. |
| Col. 3, line 17: | Delete "butyloxy" and insert --butyleneoxy--. |
| Col. 4, line 6: | Subscript "7" is not readable. |
| Col. 4, line 31: | Delete "p" and insert --$\bar{p}$--. |
| Col. 5, line 41: | Delete "p" and insert --$\bar{p}$--. |
| Col. 7, line 52: | Delete "droplet" and insert --droplets--. |
| Col. 9, line 18: | Delete "," following manner. |
| Col. 13, line 8: | Delete "," following alkyl. |
| Col. 13, line 56: | Delete "dimethyl-amino" and insert --dimethylamino--. |
| Col. 13, line 57: | Delete "cyanoethyl" and insert --cyanoethyl- --. |

Signed and Sealed this

Sixteenth Day of August 1983

[SEAL]

Attest:

GERALD J. MOSSINGHOFF

Attesting Officer    Commissioner of Patents and Trademarks